(12) United States Patent
Saeki (10) Patent No.: US 8,743,391 B2
(45) Date of Patent: Jun. 3, 2014

(54) IMAGE PROCESSING APPARATUS, IMAGE PROCESSING METHOD, AND COMPUTER PROGRAM PRODUCT

(75) Inventor: Iwao Saeki, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 759 days.

(21) Appl. No.: 12/406,628

(22) Filed: Mar. 18, 2009

(65) Prior Publication Data

US 2009/0237727 A1    Sep. 24, 2009

(30) Foreign Application Priority Data

Mar. 18, 2008   (JP) .................................. 2008-068986

(51) Int. Cl.
*G06F 3/12*   (2006.01)

(52) U.S. Cl.
USPC .......................................... 358/1.15; 762/21

(58) Field of Classification Search
USPC .......................................................... 762/21
See application file for complete search history.

(56) References Cited

U.S. PATENT DOCUMENTS

| 2002/0034328 A1* | 3/2002 | Naoi et al. ..................... 382/176 |
| 2006/0117268 A1* | 6/2006 | Talley et al. .................. 715/769 |
| 2008/0037040 A1 | 2/2008 | Hashimoto et al. |
| 2008/0209549 A1* | 8/2008 | Ishigaki ......................... 726/21 |

FOREIGN PATENT DOCUMENTS

| JP | 7-264393 | 10/1995 |
| JP | 2006-106937 | 4/2006 |
| JP | 2008-46816 | 2/2008 |

OTHER PUBLICATIONS

Japanese Office Action issued Nov. 29,2011, in Patent Application No. 2008-068986.
Japanese Office Action issued Sep. 13, 2011, in Patent Application No. 2008-068986.

* cited by examiner

*Primary Examiner* — Douglas Tran
*Assistant Examiner* — Justin Katzwhite
(74) *Attorney, Agent, or Firm* — Oblon, Spivak, McClelland, Maier & Neustadt, L.L.P.

(57) ABSTRACT

An image processing apparatus including an input information acquiring unit configured to acquire entry information entered in defined areas of an input sheet as image information. The apparatus also includes a data format information acquiring unit configured to acquire corresponding areas of a format sheet as image information. The apparatus also includes a correlating unit configured to correlate the entry information entered in the defined areas of the input sheet and the corresponding areas of the format sheet.

11 Claims, 7 Drawing Sheets

IMAGE PROCESSING APPARATUS, IMAGE PROCESSING METHOD, AND COMPUTER PROGRAM PRODUCT

CROSS-REFERENCE TO RELATED APPLICATIONS

The present application claims priority under 35 C.F.R. §1.119(a) to and incorporates by reference the entire contents of Japanese priority document 2008-068986 filed in Japan on Mar. 18, 2008.

BACKGROUND OF THE INVENTION

1. Field of the Invention

The present invention relates to an image processing apparatus, an image processing method, and computer program product for the image processing apparatus.

2. Description of the Related Art

Generally, the format of a resume, a business curriculum vitae, etc. is different for every company. Therefore, those who write a resume etc. have to write the same information (name, address, etc.) repeatedly for every resume of each company. Since it is becoming now normal to submit a resume, etc. to many companies, substantial labor is applied to those who write a resume etc. Moreover, when an order person places an order with many companies for parts etc., the same matter as the above arises.

SUMMARY OF THE INVENTION

It is an object of the present invention to at least partially solve the problems in the conventional technology.

According to an aspect of the present invention, there is provided an image processing apparatus including an input information acquiring unit configured to acquire an entry information entered in defined areas of an input sheet as image information; a data format information acquiring unit configured to acquire corresponding areas of a format sheet as image information; and a correlating unit configured to correlate the entry information entered in defined areas of the input sheet and the corresponding areas of the format sheet.

According to another aspect of the present invention, there is provided an image processing method including acquiring an entry information entered in defined areas of an input sheet as image information; acquiring corresponding areas of a format sheet as image information; and correlating the entry information entered in defined areas of the input sheet and the corresponding areas of the format sheet.

According to still another aspect of the present invention, there is provided a computer program product including computer program codes stored on a computer-readable recording medium which when executed on a computer cause the computer to execute the image processing method described above.

It is to be understood that both the foregoing general description of the invention and the following detailed description are exemplary, but are not restrictive of the invention.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE INVENTION

Exemplary embodiments of the present invention are described below in detail with reference to the accompanying drawings.

Exemplary embodiments of the present invention will be explained below in detail with reference to accompanying drawings.

Figure 1:
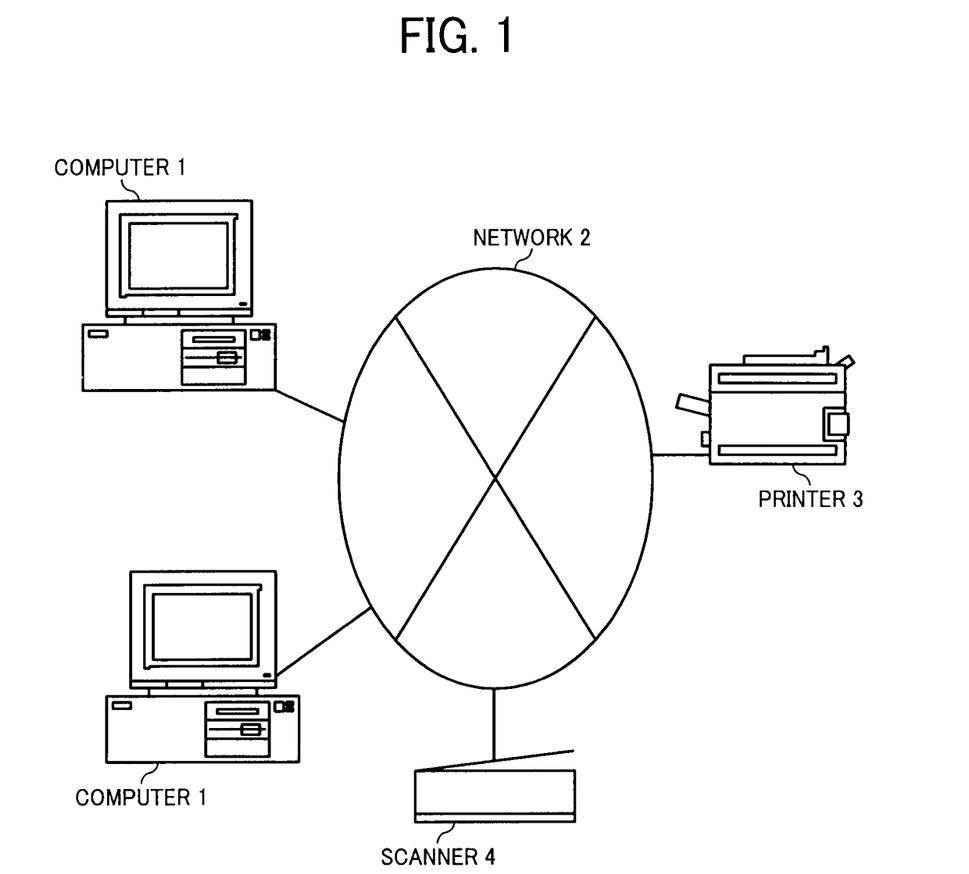
FIG. 1 is a pictorial diagram exemplifying the configuration of an information processing system including an information processing apparatus according to an embodiment of the present invention.

FIG. 1 is a schematic for illustrating a system configuration according to a first embodiment of the present invention. In an information process system according to the present embodiment, printer 3 and scanner 4 are connected to a computer 1 via a network 2 such as a local area network (LAN). A digital document data created by computer 1 is transmitted to the printer 3 via the network 2. The digital document data is printed out by the printer 3. Moreover, the digital document data read via the scanner is transmitted to the computer 1 via the network 2.

Figure 2:
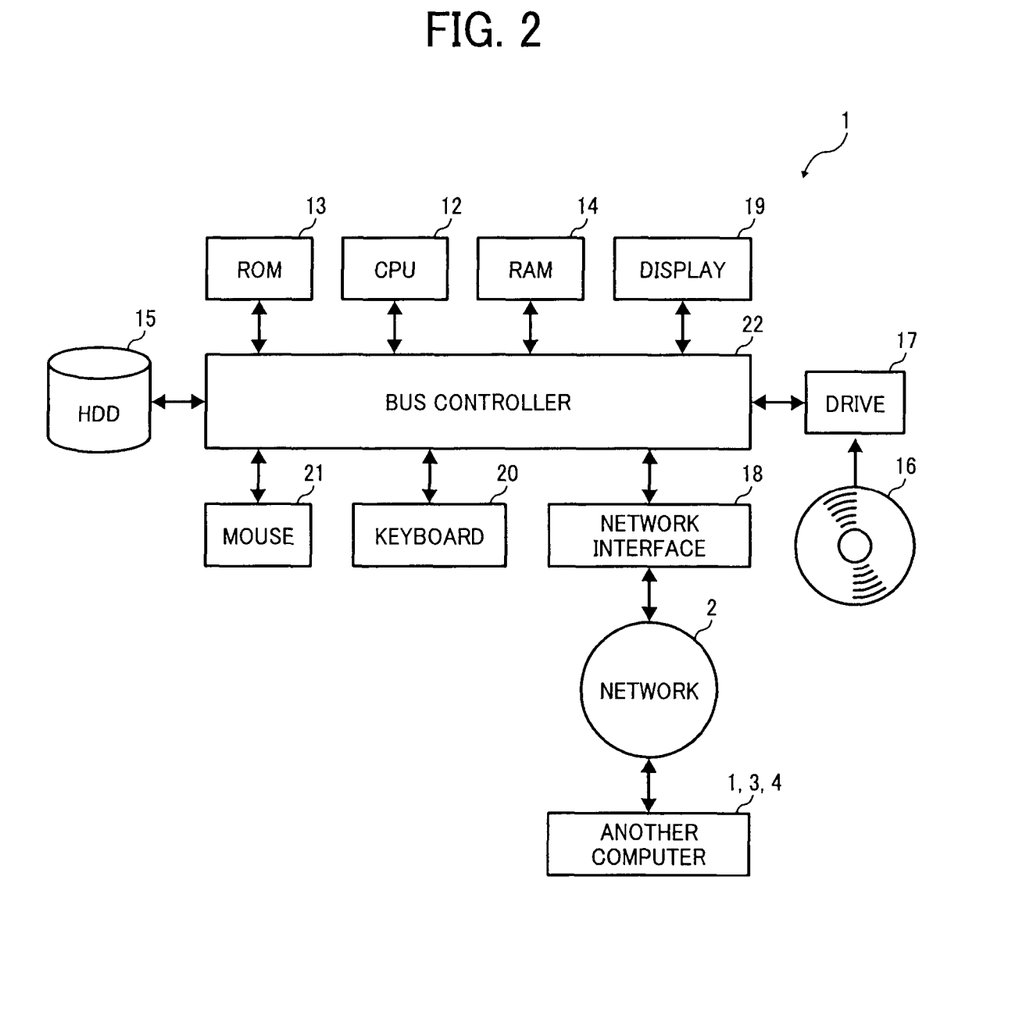
FIG. 2 is a block diagram showing the hardware configuration of a computer incorporated in the apparatus.

FIG. 2 is a block diagram of the document image processing computer 1 of the invention. The computer 1 includes a central processing unit (CPU) 12, a read only memory (ROM) 13 that stores a basic input output system (BIOS), a first storage such as a random access memory (RAM) 14 that temporarily stores information during processing, a second storage such as a hard disk drive (HDD) 15 that stores an application program, a processing result, and the like, a drive 17 for a removable medium 16 serving as a storage medium for storing information on the outside or distributing information to the outside or obtaining information (an application program, etc.) from the outside, a network interface 18 for connection to the network 2 to communicate with external computers, a display 19 that displays a progress and a result of a processing, a keyboard 20, and a mouse 21, that are used by an operator to input an instruction and information, to the computer 1. A bus controller 22 controls data communication among the above components.

Various storage media may be used as the removable medium 16. The storage media includes a magnetic storage medium, such as a flexible disk, a hard disk, or a magnetic tape; a magneto-optical storage medium, such as an magneto-optical disc (MO); an optical storage medium, such as a compact disk (CD), a compact-disk read-only memory (CD-ROM), a compact-disk recordable (CD-R), a compact-disk rewritable (CR-RW), a digital-versatile-disk read-only memory (DVD-ROM), a digital-versatile-disk recordable (DVD-R), a digital-versatile-disk random-access memory (DVD-RAM), a digital-versatile-disk rewritable (DVD-RW), and a digital-versatile-disk rewritable (DVD-RW), and a semiconductor memory.

In data transmission, data is transmitted to the network interface 18, and the network interface 18 outputs a signal to the network 2. The network interface 18 judges whether the data received by the network interface 18 is necessary. The network interface 18 captures the data if the data is necessary, and discards the data if the data is unnecessary. Transmission and reception of all data are performed through the network interface 18.

In general, when a viewer turns power on to computer 1, the CPU 2 starts a program called loader included in the BIOS in the ROM 3, and reads an operating system (OS) for managing hardware and software of the computer 1 into the RAM 14 from the HDD 15. When the OS is started, the OS starts an application program, reading and storing information according to operation by the viewer. WINDOWS™ (trademark of Microsoft Corporation) or UNIX™ (trademark of X/Open, Inc.) are representative examples of the OS. An application program operates on the OS. The application program is not limited to an application program operating on a predetermined OS and may be an application program that causes the OS to execute a part of processing, or may be an application program included as a part of a group of program files constituting predetermined application software, OS, or the like.

In general, when the application program is installed, the application program recorded in the removable medium 16 is installed in the HDD 15. Therefore, the removable medium 16 could be a recording medium that stores the application program. The application program may be obtained from the outside via, for example, the network interface 18 and installed in the HDD 15.

In the computer 1, when the application program is started to operate on the OS, the CPU 12 executes various kinds of arithmetic processing to centrally control the respective units according to the application program.

Hereinafter, of various kinds of calculation processing executed by the CPU 12 in the computer 1, characteristic processing according to one embodiment will now be described.

Figure 5:
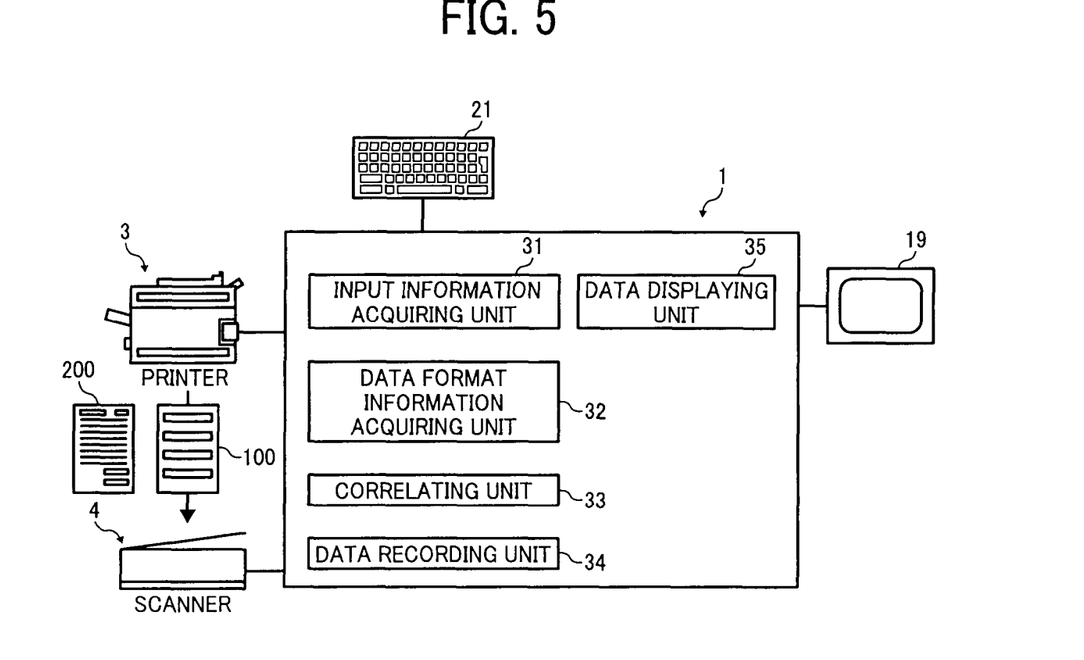
FIG. 5 is a block diagram illustrating a functional configuration associated with the information editing processes of the computer 100.

The HDD 15 of the computer 100 stores an information editing program as an application program. In particular, with the start of the information editing program executing on an OS, the CPU 2 of the computer 100 controls the individual units according to the information editing program to execute information editing processes. FIG. 5 is a block diagram illustrating a functional configuration associated with the information editing processes of the document image processing computer 100.

Hereinafter, the information editing processes is described. As shown in FIG. 5, with the operation of the CPU 12 according to the information editing program, the computer 1 realizes input information acquiring unit 31, data format information acquiring unit 32, correlating unit 33, data recording unit 34, and data displaying unit 35.

Figure 3:
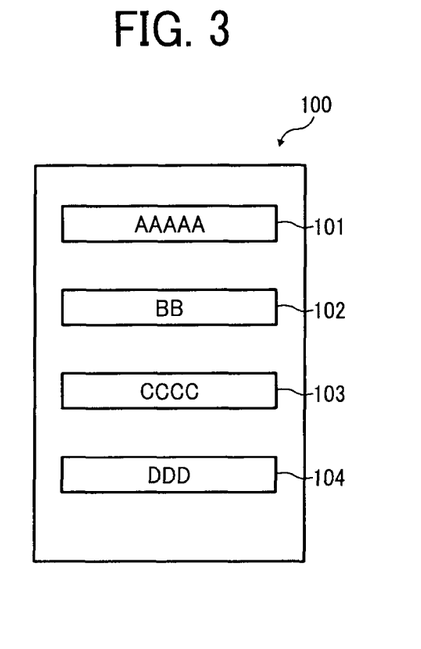
FIG. 3 is a view exemplifying a input sheet.

The input information acquiring unit 31 operates the scanner unit 4 to read the input sheet 100 shown in FIG. 3 and acquires the information entered in script on the input sheet 100 as image information. More specifically, as shown in FIG. 3, the rectangle (or other defined) areas 101-104 for entering an input item are printed on the input sheet 100. The input information acquiring unit 31 obtains the entry information entered in the rectangle areas 101-104 of the input sheet 100 as image information. The information entered in the rectangle areas 101-104 of the input sheet 100 can be extracted in one example of the invention by abstracting the difference between the image information after entry and the image information before entry.

Figure 4:
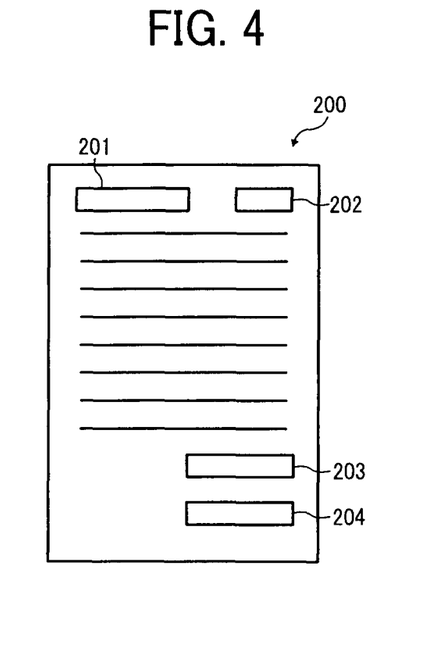
FIG. 4 is a view exemplifying a format sheet.

The data format information acquiring unit 32 operates the scanner unit 4 to read the format sheet 200 shown in FIG. 4 and acquires an image information on the format sheet 200 as format information. By the format sheet 200, the locations which correspond to the entry information entered in the areas 101-104 of the input sheet 100 are decided. More specifically, as shown in FIG. 4, the rectangle areas 201-204 are printed on the format sheet 200. The data format information acquiring unit 32 recognizes the rectangle areas 201-204 of the format sheet 200 as the recording position or display position of the entry information entered in the rectangle areas 101-104 of the input sheet 100.

Figure 6:
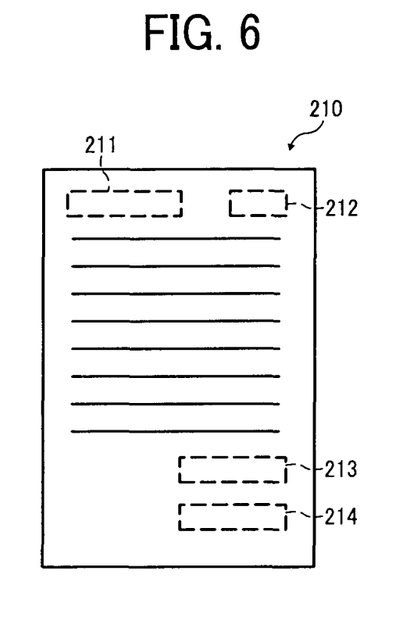
FIG. 6 is a view exemplifying changes of a format sheet.

This specific operation is not intended to give limitation to the present invention but rather is given as an illustrative teaching. As shown in FIG. 6, the format sheet 210 to which the rectangle areas 211-214 were expressed with a dashed line may be used. Since the data format information acquiring unit 32 can recognize the dashed line in distinction from a solid line, it can recognize the display position of the information entered certainly. Moreover, the input sheet 100 and the format sheet 200 may be printed by the printer 3 or the already printed ready made.

The correlating unit 33 correlates the rectangle areas 201-204 of a format sheet 200, and the rectangle areas 101-104 of an input sheet 100. In this illustration, each rectangle area of an input sheet 100 and a format sheet 200 are respectively correlated according to the order scanned with the scanner 4. For example, when the format sheet 200 is scanned from the upper left, at first the rectangle area 101 is correlated, then the rectangle areas 202, 203, and 204 are correlated in the turn from a top to the bottom. When the format sheet 200 is scanned from the upper left, the rectangle area 201 is correlated first, then the rectangle areas 202, 203, and 204 are correlated in accordance with the turn from a top to the bottom.

Figure 7:
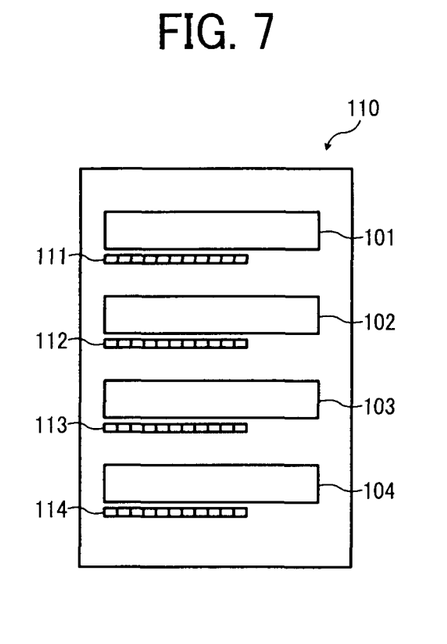
FIG. 7 is a pictorial view showing boxes on a format sheet.
Figure 8:
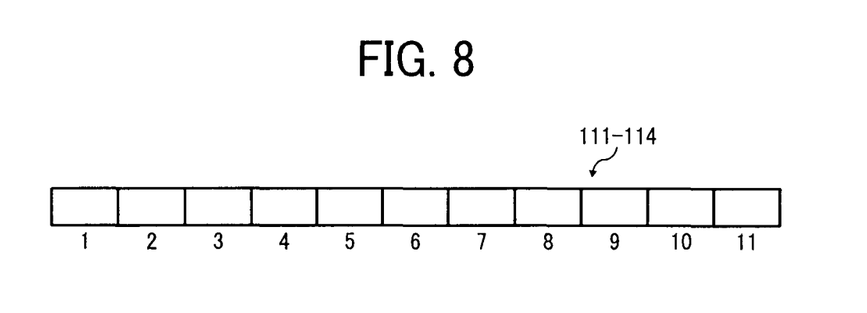
FIG. 8 is a pictorial view showing boxes on the format sheet.
Figure 9:
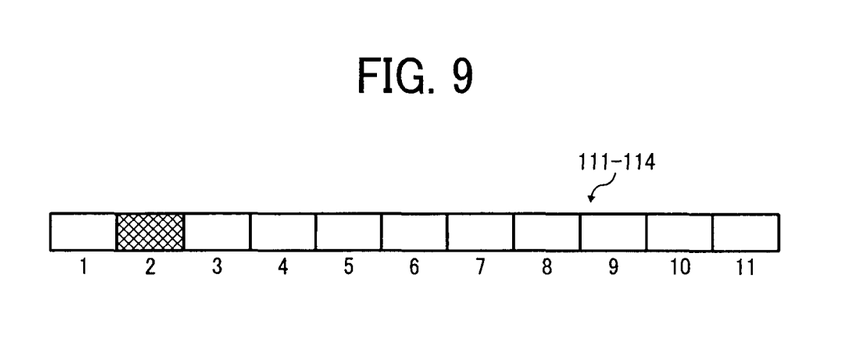
FIG. 9 is a pictorial view showing boxes on the format sheet.

Furthermore, there are many methods for associating the rectangle area 201-204 of a format sheet 200 and the rectangle area 101-104 of an input sheet. For example, as shown in FIG. 7, the box 111-114 corresponding to either of each rectangle area of a format sheet 200 may be respectively printed near the rectangle area 101-104 of the input sheet 110. As shown in FIG. 8, the weight with which each rectangle area of the format sheet 200 is correlated is respectively printed in the box 111-114. In the example shown in FIG. 9, the 2nd weight from the left is correlated with the 2nd rectangle area 202 of the format sheet 200.

The data recording unit 34 records the result correlated by the correlating unit 33 in the RAM 14, the HDD 15, or the removable media 16. In addition, if the data recording unit 34 is not contained in the image processing apparatus 1, the data recording unit 34 may be contained in a computer server connected to the image processing apparatus 1 via a network.

The data displaying unit 35 displays the input information entered in the rectangle (or defined) areas 101-104 of the input sheet 100 on the display 19 based on the result which the correlating unit 33 correlated.

Figure 10:
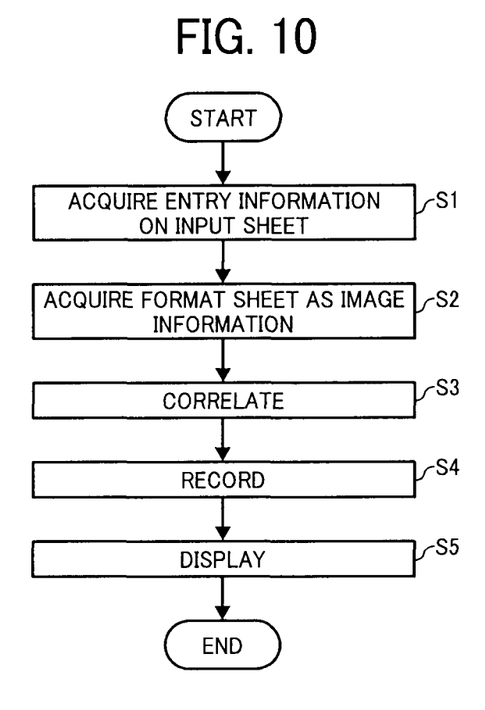
FIG. 10 is a flow diagram illustrating a flow of the information editing processes.

FIG. 10 is a flow diagram illustrating a flow of the information editing processes. As show in FIG. 10, the input information acquiring unit 31 acquires the information entered in script on the input sheet 100 as image information (step SI). The data format information acquiring unit 32 acquires the image information on the format sheet 200 as format information.

The correlating unit 33 correlates the rectangle areas 201-204 of a format sheet 200, and the rectangle areas 101-104 of an input sheet 100 (step S3). The data recording unit 34 records the result correlated by the correlating unit 33 in the RAM 14, the HDD 15, or the removable medial 6 (step S4). The data displaying unit 35 displays the input information entered in the rectangle areas 101-104 of the input sheet 100 on the display 19 based on the result which the correlating unit 33 correlated (step S5).

Figure 11:
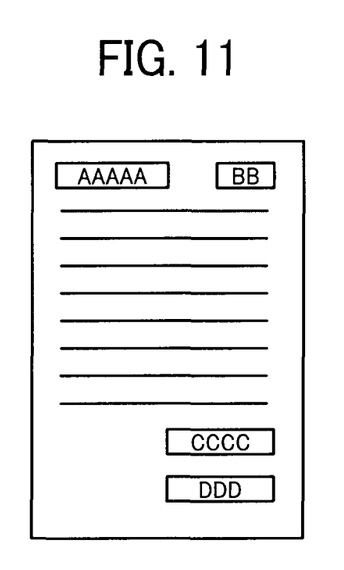
FIG. 11 is a conceptual diagram illustrating the information recorded in a random access memory RAM, a hard disk drive HDD, or a removable media.

FIG. 11 is a conceptual diagram illustrating the information recorded in the RAM 14, HDD 15, or the removable media 16. As shown in FIG. 11, data that correlated between the rectangle areas 201-204 of a format sheet 200 and the rectangle areas 101-104 of an input sheet 100 is recorded in the RAM 14, the HDD 15, or the removable media 16.

Figure 16:
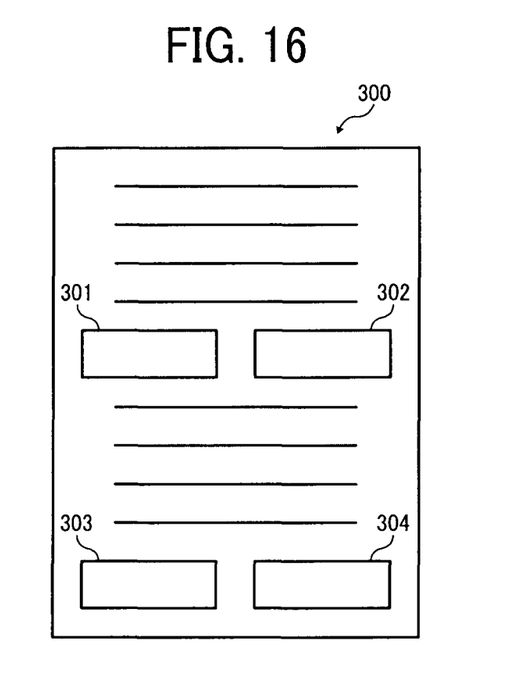
FIG. 16 is a view exemplifying changes of a format sheet.
Figure 17:
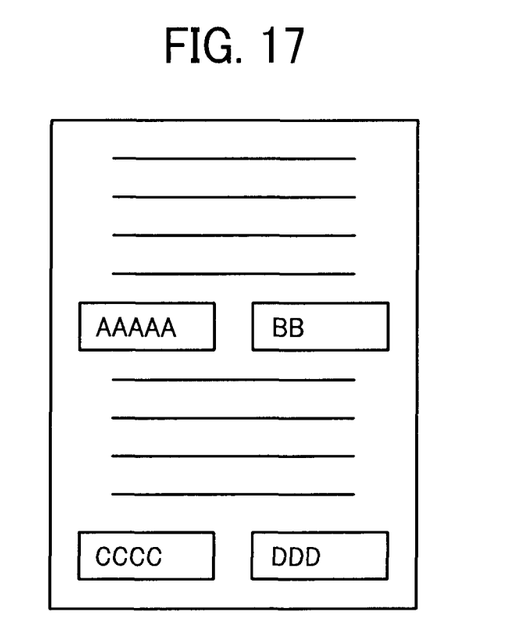
FIG. 17 is a conceptual diagram illustrating the information recorded in the RAM, the HDD, or the removable media.

Such a computer 1 is used in the following manner. For example, it is troublesome for a user to enter the same character in two or more kinds of formats. In such a case, if a user writes down information only in one input sheet 100, each of two kinds of format sheets 200, 300 (see FIG. 16) can be used to correlate the information, and the correlated information is recorded in the data recording unit 34. In this case, data shown in FIG. 11 corresponding to a format sheet 200 and data shown in FIG. 17 corresponding to a format sheet 300 are recorded in the data recording unit 34.

Figure 12:
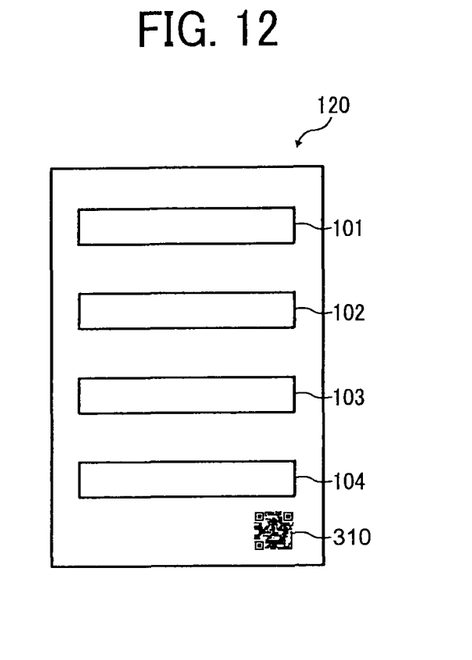
FIG. 12 is a view exemplifying changes of an input sheet.

Instead of the format sheets 200, 300 being used, only the input sheet 120 as shown in FIG. 12 may be used. The code symbol 310, where the same information as the format sheets 200, 300 was embedded, is printed on the input sheet 120. For example, the code symbol 125 can be a two-dimensional bar code. When the input sheet 100 entered by the user is scanned via the scanner unit 4, the information entered in the rectangle areas 101-104 is extracted by the input information acquiring unit 31, and the code symbol 125 is decoded by the data format information acquiring unit 32. Thus, a format sheet 200 or 300 specified by the data format information acquiring unit 32 produces the same result as the format sheets 200, 300 being scanned by the scanner 4. That is, if the input sheet 120 is scanned, this produces the same result, with the data of the input sheet 120 for each format sheet 200, 300 being correlated and recorded in the data recording unit 34.

The second embodiment of the present invention will be explained below in detail with reference to accompanying drawings. In addition, the same portion as the first embodiment mentioned above is shown by the same sign, and a representation of the same portion is omitted for the sake of brevity.

In this embodiment, it is pointed out by the script command whether the input information entered to the input sheet 100 corresponds effectively to each rectangle areas 201-204 of a format sheet 200.

Figure 13:
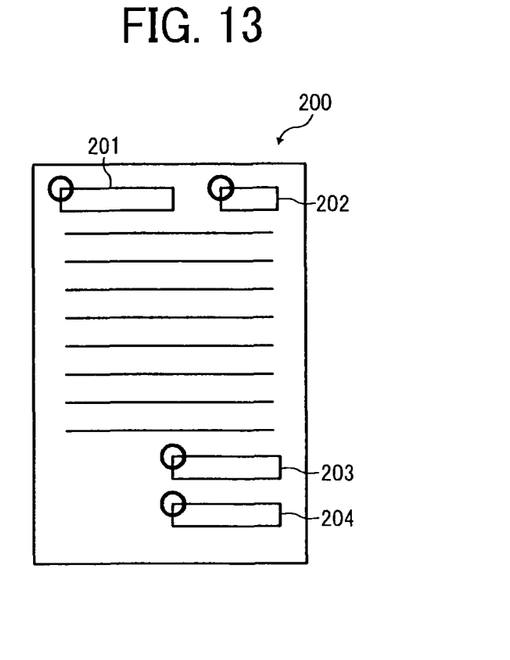
FIG. 13 is a view exemplifying a format sheet.
Figure 14:
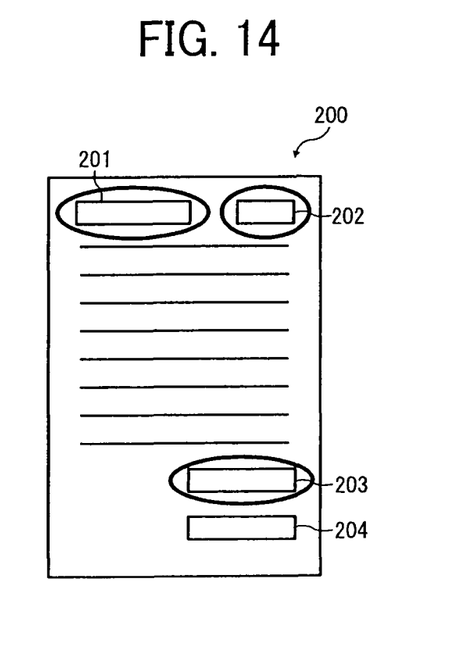
FIG. 14 is a view exemplifying a format sheet.
Figure 15:
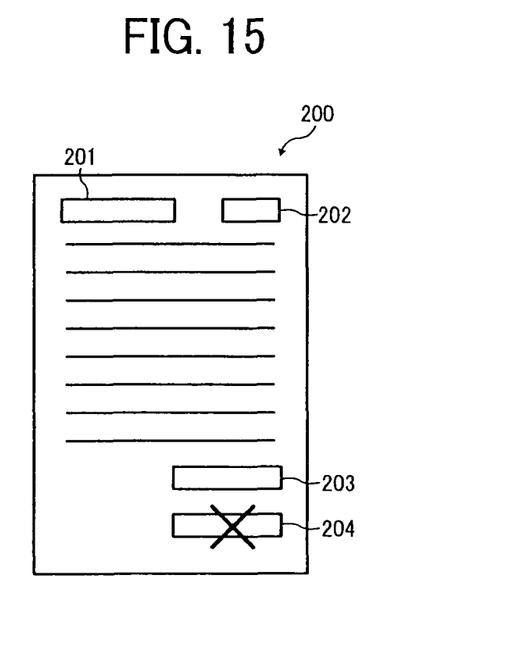
FIG. 15 is a view exemplifying a format sheet.

FIGS. 13 to 15 are plan views showing exemplary format sheets 200 in which a command for an input schedule location or a suppression schedule location is entered. As shown in FIGS. 13 to 15, in this embodiment, an operator can carry out script input of the command to the rectangle areas 201-204 on a format sheet 200.

In the example shown in FIG. 13, "O" entered by the operator in the upper left of a rectangle area functions as a command. Such a command "O" is extracted by taking the difference with the image information of a format sheet 200 by the data format information acquiring unit 32. The data format information acquiring unit 32 acquires the contents of dispensation which the extracted command "O" correlated. The dispensation, which shows the input schedule location (display position) of the information entered in the rectangle areas 101-104 of one of the input sheet 100, is set by recognition of command "O." Thereby, the data recording unit 34 recognizes the rectangle area as the area where command "O" was entered and as the input schedule location (display position) of the information entered in the rectangle areas of the input sheet 100. The data recording unit 34 assumes that the input information entered in the rectangle areas 101-104 of input sheet 100 corresponds to the rectangle areas 201-204 of the format sheet 200, and records the input information in the RAM 14, the HDD 15, or the removable medial 6.

Moreover, in the example shown FIG. 14, "O" entered by the operator as surrounding a rectangle area functions as a command. Such command "O" is extracted by taking the difference with the image information of a format sheet 200 by the data format information acquiring unit 32. Thereby, the data recording unit 34 recognizes the rectangle area as an area where command "O" was entered and as the input schedule location (display position) of the information entered in the rectangle areas of the input sheet 100. The data recording unit 34 assumes that the input information entered in the rectangle areas 101-104 of input sheet 100 corresponds to the rectangle areas 201-204 of the format sheet 200, and records the input information in the RAM 14, the HDD 15, or the removable media 16. In addition, in this example, the data recording unit 34 disregards the rectangle area where "O" is not entered from the input schedule location of the entered information.

Moreover, in the example shown FIG. 15, "X" entered in the rectangle area functions as a command. The dispensation which shows the suppression schedule location of the information entered in the rectangle areas of an input sheet 100 is set as such command "X." The data recording unit 34 disregards the rectangle area where command "X" was entered from the input schedule location of the information entered in the rectangle areas of the input sheet 100 (display position). The data recording unit 34 assumes the input information entered in the rectangle areas 101-104 of input sheet 100 corresponds to the rectangle areas 201-204 of the format sheet 200, and records the input information in the RAM 14, the HDD 15, or the removable media 16.

Since the input schedule location and suppression schedule location on a format sheet 200 can be specified by the script command, it is very convenient for a user.

Numerous modifications and variations of the invention are possible in light of the above teachings. It is therefore to be understood that within the scope of the appended claims, the invention may be practiced otherwise than as specifically described herein.

What is claimed is:

1. An image processing apparatus comprising: an input information acquiring unit configured to acquire an entry information entered in defined areas of an input sheet as image information by abstracting any difference between the image information on the input sheet before and after entry of the entry information on the input sheet;

a data format information acquiring unit configured to recognize anywhere on a data sheet a dashed line boundary from a solid line boundary and acquire corresponding areas of a printed format sheet designated by an actual dashed line boundary existing on the printed format sheet as image information pertaining to a display position; and a correlating unit configured to correlate the entry information entered in said defined areas of the input sheet and the corresponding areas of the printed format sheet according to at least one criteria of the input sheet.

2. The image processing apparatus according to claim 1, further comprising:

a data recording unit configured to record results correlated by the correlating unit in a memory.

3. The image processing apparatus according to claim 1, further comprising:

a data displaying unit configured to display results correlated by the correlating unit on a display.

4. The image processing apparatus according to claim 1, wherein the correlating unit is configured to correlate respectively in the order which each defined area of the input sheet and corresponding area of the printed format sheet are acquired.

5. The image processing apparatus according to claim 1, wherein the data format information acquiring unit is configured to read a code symbol for specifying format information printed on the input sheet and to acquire the format information which the code symbol correlated.

6. The image processing apparatus according to claim 1, wherein the correlating unit is configured to:

acquire an entry information entered in defined areas of an input sheet as image information;

acquire corresponding areas of the printed format sheet as image information; and correlate the entry information entered in defined areas of the input sheet and the corresponding areas of the printed format sheet.

7. The image processing apparatus of claim 6, wherein the correlating unit is further configured to:

record results correlated by the correlating unit in a memory.

8. The image processing apparatus of claim 5, further comprising:

a display configured to display results correlated by the correlating unit.

9. The image processing apparatus of claim 5, wherein the correlating unit is further configured to:

correlate respectively the order in which each defined area of the input sheet and corresponding area of the printed format sheet are acquired.

10. The image processing apparatus of claim 5, wherein the data format information acquiring unit is configured to:

read a code symbol for specifying format information printed on the input sheet; and acquire the format information which the code symbol correlated.

11. A non-transitory computer readable medium having embedded therein a computer program, which when executed on a computer, causes the computer to be programmed as in any one of claims 6 to 10.

* * * * *